(12) United States Patent
Ogawa et al.

(10) Patent No.: US 6,705,424 B2
(45) Date of Patent: Mar. 16, 2004

(54) VEHICLE STEERING SYSTEM

(75) Inventors: Kenji Ogawa, Tokyo (JP); Kazushi Shirasawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/136,382

(22) Filed: May 2, 2002

(65) Prior Publication Data

US 2003/0094329 A1 May 22, 2003

(30) Foreign Application Priority Data

Nov. 19, 2001 (JP) ........................................ 2001-353130

(51) Int. Cl.$^7$ ................................................ B62D 5/04
(52) U.S. Cl. ........................... 180/446; 701/41; 701/42; 180/444
(58) Field of Search ................................ 180/443, 444, 180/446, 402, 403, 422; 701/41, 42

(56) References Cited

U.S. PATENT DOCUMENTS

| | | | | |
|---|---|---|---|---|
| 4,656,409 A | * | 4/1987 | Shimizu | 318/689 |
| 4,830,127 A | * | 5/1989 | Ito et al. | 180/446 |
| 5,528,497 A | * | 6/1996 | Yamamoto et al. | 701/41 |
| 5,873,430 A | * | 2/1999 | Mueller et al. | 180/402 |
| 5,908,457 A | * | 6/1999 | Higashira et al. | 701/41 |
| 6,032,757 A | * | 3/2000 | Kawaguchi et al. | 180/446 |
| 6,059,068 A | * | 5/2000 | Kato et al. | 180/402 |
| 6,161,069 A | * | 12/2000 | Fujita | 701/41 |
| 6,199,654 B1 | * | 3/2001 | Kojo et al. | 180/443 |
| 6,213,248 B1 | * | 4/2001 | Kawaguchi et al. | 180/446 |
| 6,496,762 B2 | * | 12/2002 | Kurishige et al. | 701/41 |
| 6,523,637 B1 | * | 2/2003 | Nakano et al. | 180/402 |

FOREIGN PATENT DOCUMENTS

JP          6-206553          7/1994

* cited by examiner

Primary Examiner—Lesley D. Morris
Assistant Examiner—L. Lum
(74) Attorney, Agent, or Firm—Sughrue Mion, PLLC

(57) ABSTRACT

To provide a steering system that may simultaneously allow manual steering and automatic steering, and in addition ensure the same steering feeling as normal even if the manual and automatic steering are simultaneously performed, there is provided a steering system including: a target reactive force generating unit for generating a target value of a reactive torque; a reactive torque detecting unit for detecting a reactive torque; a reactive torque controlling unit for controlling a drive torque; a steerable vehicle wheel controlling mechanism for controlling a steering direction of steerable vehicle wheels; an actual steering detecting unit for detecting the actual steering angle of the steerable vehicle wheels; a target steering angle generating unit for generating a target value of the steering angle of the steerable vehicle wheels; and an actual steering angle controlling unit for driving and controlling the steerable vehicle wheel controlling mechanism.

23 Claims, 9 Drawing Sheets

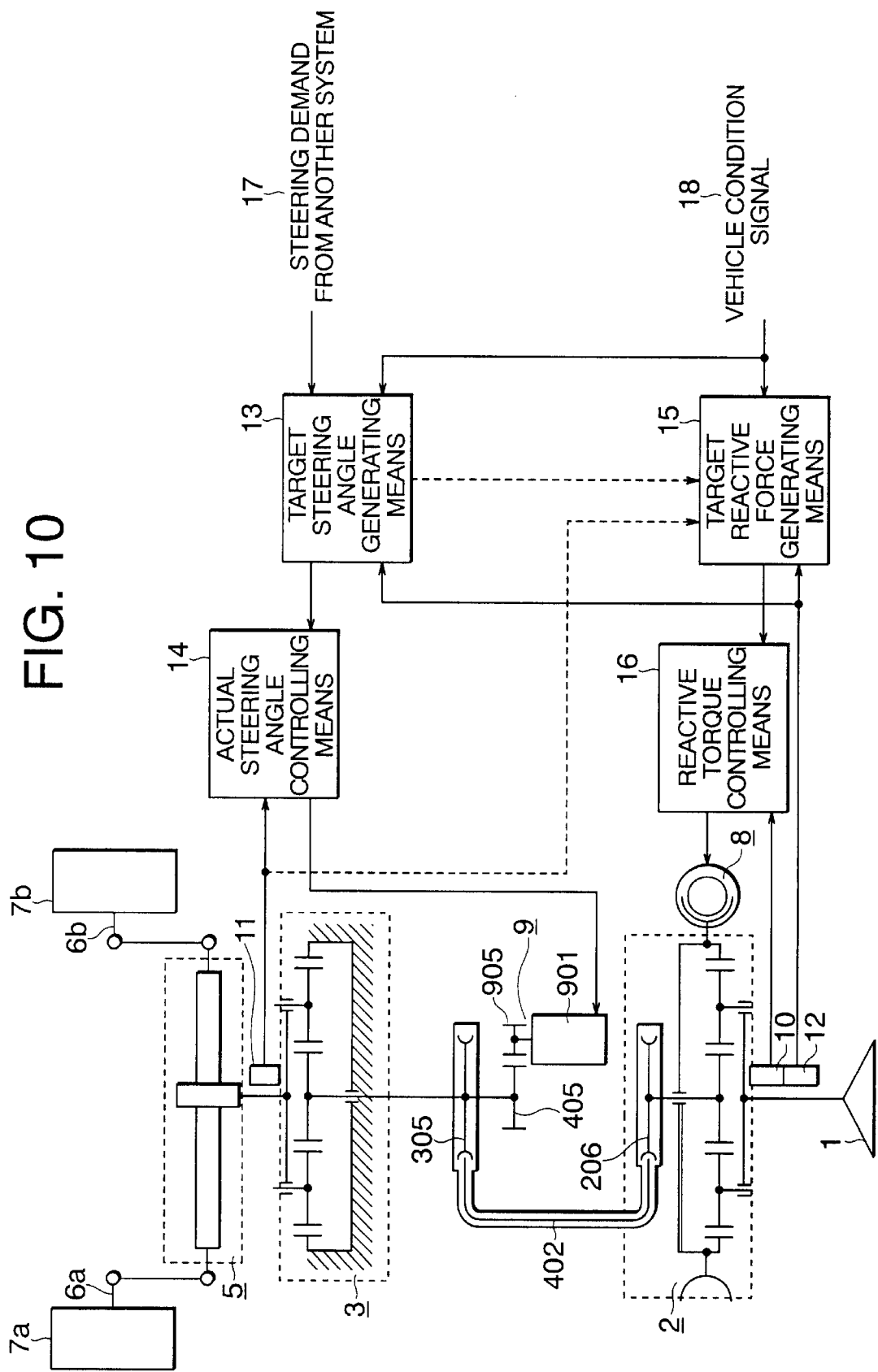

VEHICLE STEERING SYSTEM

This application is based on Application No.2001-353130, filed in Japan on Nov. 19, 2001, the contents of which are hereby incorporated by reference.

BACKGROUND OF THE INVENTION

Field of the Invention

The present invention relates to a vehicle steering system for steering steerable wheels of a vehicle, and more particularly to a vehicle steering system provided with a sub steering mechanism that is needed in the case where automatic steering for compensating for a steering amount by a driver is performed or steering for automatic driving is performed.

In a vehicle steering system, it has conventionally been proposed to automatically assist and control a direction of steerable vehicle wheels so as to optimize, for example, the steering characteristics (actual change in the vehicle advancing direction with respect to an rotating amount of a steering wheel) or to automatically drive and control a steering system for the driver in order to keep the travel position of the vehicle within a vehicle lane.

As the vehicle steering system for performing such steering control, a number of vehicle steering apparatuses which adopt a steering system provided with a sub steering mechanism that may be electrically controlled, such as that disclosed in, for example, Japanese Patent Application Laid-Open No. Hei 6-206553 or a vehicle steering system called a steering-by-wire in which a mechanical link between the steering wheel and the steered vehicle wheels are eliminated are disclosed.

The above-described conventional vehicle steering system provided with a sub steering mechanism is composed of a structure for adding steering assist by the sub steering mechanism composed of a planetary gear mechanism and the like to the main steering being performed by the driver to thereby steer the steerable vehicle wheels, i.e., a mechanical angle addition mechanism for adding an assist steering angle to the main steering angle.

However, the assist steering torque to be applied by the sub steering mechanism by means of such an angle addition mechanism is distributed by being divided into a steering wheel reactive torque and a torque for steering the steerable vehicle wheels by the sub steering mechanism. Accordingly, the steering wheel reactive force that was not expected by the driver is generated when the sub steering mechanism is driven.

The driver performs, in response to that steering wheel reactive force, various steering operations which can not be uniquely determined, such as "continuing steering of the steering wheel regardless of the change of the steering wheel reactive force", "steering the steering in a manner such as to counter the change of the steering wheel reactive force", "steering the steering wheel in a direction in which the reactive force is generated, in response to the change of the steering wheel reactive force".

For example, in the case where a driver intends to achieve greater steering than that attained by steering of the steering wheel by means of the sub steering mechanism while increasing the steering amount of the steering wheel, the driver feels that the steering wheel reactive force becomes heavier as he continues to increase the steering of the steering wheel. In contrast, when the driver returns the steering wheel back, the steering angle of the steerable vehicle wheels, which is expected to be obtained by adding the assist steering angle by the sub steering mechanism, becomes insufficient by an amount equivalent to the amount of steering which the driver has returned by steering the steering wheel back.

Accordingly, under the condition that the steering wheel operation by the driver performed in response to the steering wheel reactive force generated by driving of the sub steering mechanism is not uniquely determined, it is difficult to automatically control the direction of the steerable vehicle wheels for the above-described reason. Also, in the case where the above-described steering wheel reactive force is compensated for by another actuator as described in Japanese Patent Application Laid-Open No. Hei 6-206553, it is difficult to completely eliminate the steering wheel reactive force due to control lag or the like. Therefore, this is not a perfect countermeasure for the foregoing problem.

On the other hand, in the steer-by-wire system, the steering wheel reactive force to be transmitted to the driver through the steering wheel is determined according to the condition of the vehicle and is given to the steering wheel by the reactive force system. Also, the steering wheel operation by the driver is detected. The steering wheel target value is calculated on the basis of the detected steering wheel operation to thereby perform, by the steering system, steering by the actual steering angle. Accordingly, the above-described problem may be overcome.

However, provision of a mechanical stand-by back-up mechanism (for example, connection between the steering wheel shaft and the actual steering shaft through a clutch) for transmitting the driver's steering wheel operation to the steerable vehicle wheels when the apparatus is broken down is essential. Even if the back-up system is assembled in, there is a disadvantage in that the steering operation is disabled for a brief moment upon gear switching until the connection is restored by means of the clutch.

Also, in the steer-by-wire system, there is no mechanical link between the steering wheel and the steerable vehicle wheels. Therefore, there is no guarantee that the relationship between the direction of the steering wheel and the direction of the steerable vehicle wheels upon activation of the system is correct. As a result, there is a problem that it is necessary to take a synchronism between the steering wheel angle and the actual steering angle so as to ensure the correct relationship.

Furthermore, in the steering mechanism such as described in Japanese Patent Application Laid-Open No. Hei 6-206553, since the mechanical link mechanism exists from the steering wheel to the steered vehicle wheels, there is a risk that the steering wheel would harm the driver due to rearward movement of the steering mechanism upon collision of the vehicle.

SUMMARY OF THE INVENTION

In order to overcome the above-described defects, an object of the present invention is to provide a steering system that may simultaneously allow manual steering and automatic steering, and in addition ensure the same steering feeling as normal even if the manual steering and automatic steering are simultaneously performed.

According to the present invention, there is provided a vehicle steering system including a steering mechanism for steering steerable vehicle wheels in accordance with a rotating amount of a steering wheel and a biasing amount given by a sub steering mechanism for compensating for the rotational amount of the steering wheel by applying a drive torque thereto. The system comprises a target reactive force generating means for generating a target value of a reactive torque to be applied to the steering wheel. Also provided are a reactive torque detecting means for detecting the reactive torque being applied to the steering wheel; a reactive torque controlling means for controlling the drive torque to be applied to the sub steering mechanism so that a target torque generated by the target reactive force generating means and the reactive torque detected by the reactive torque detecting means become equal to each other. The system comprises a steerable vehicle wheel controlling mechanism for controlling a steering direction of the steerable vehicle wheels; an actual steering angle detecting means for detecting an actual steering angle of the steerable vehicle wheels to be controlled by the steerable vehicle wheel controlling mechanism. Also provided are a target steering angle generating means for generating a target value of the steering angle of the steerable vehicle wheels; and an actual steering angle controlling means for driving and controlling the steerable vehicle wheel controlling mechanism so that the target steering angle generated by the target steering angle generating means and the actual steering angle detected by the actual steering angle detecting means becomes equal to each other.

In the vehicle steering system in accordance with the present invention, it is possible to simultaneously execute the automatic steering operation on the basis of the target steering angle generating means with the manual steering operation by the steering wheel and to provide the steering feeling as normal. Therefore, it is possible to simultaneously execute the automatic steering operation on the basis of the target steering angle generating means with the manual steering operation by the steering wheel and to provide the steering feeling as normal.

BRIEF DESCRIPTION OF THE DRAWINGS

In the accompanying drawings;

FIG. 10 is a structural view of a vehicle steering system in accordance with Embodiment 5 of the present invention.

DESCRIPTION OF THE PREFERRED EMBODIMENTS

Embodiment 1

Figure 1:
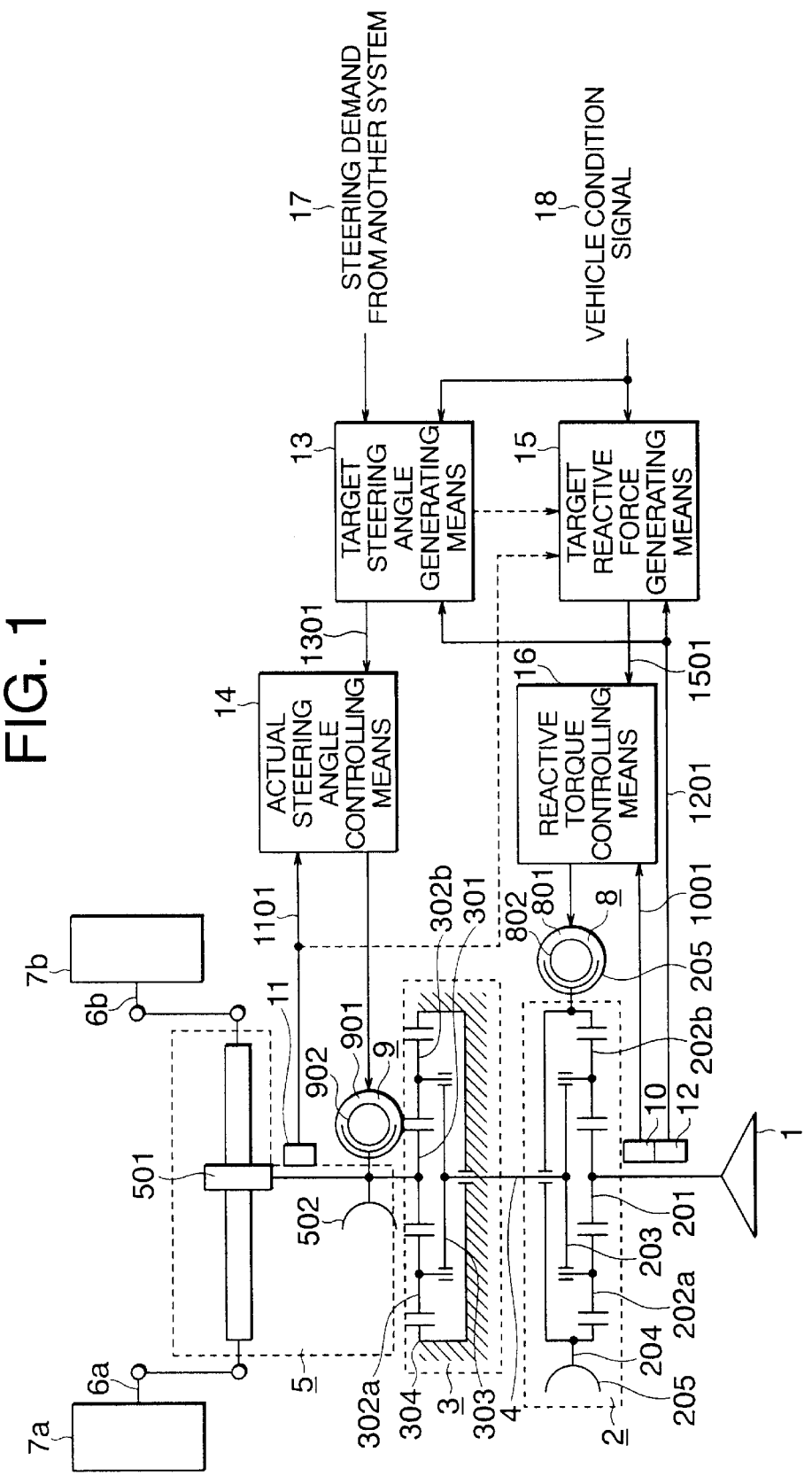
FIG. 1 is a structural view showing a vehicle steering system in accordance with Embodiment 1 of the present invention.

FIG. 1 is a structural view showing a vehicle steering system in accordance with Embodiment 1 of the present invention. The structure in FIG. 1 will now be described.

In FIG. 1, a steering wheel 1 is steered by a driver for steering steerable vehicle wheels 7a, 7b. A first planetary gear mechanism 2 is composed of a sun gear 201 coupled with the steering wheel 1, planetary gears 202a, 202b supported by a carrier mechanism 203, a ring gear 204 and a worm wheel 205 for rotating the ring gear 204.

Also, a second planetary gear mechanism 3 is composed of a sun gear 301, planetary gears 302a, 302b supported by a carrier mechanism 303 coupled with the carrier mechanism 203 of the above-described first planetary gear mechanism through a shaft 4, and a stationary ring gear 304. The shaft 4 couples the carrier 203 of the above-described first planetary gear mechanism 2 and the carrier mechanism 303 of the above-described second planetary gear mechanism 3 for transmission of power.

A rack-and-pinion type steerable vehicle wheel controlling mechanism 5 has a rack and pinion 501 coupled mechanically with the sun gear 301 of the above-described second planetary gear mechanism 3 for coupling a steering mechanism driving means 9 used as a steering actuator and a worm wheel 502 that may be rotated in a reverse direction for rotating the rack and pinion 501. Also, the steerable vehicle wheels 7a, 7b are connected to the above-described rack and pinion 501 through knuckle arms 6a, 6b.

Also, a reactive torque generating means 8 serves to impart the reactive torque to the steering wheel 1 and is composed of a reactive motor 801 and a worm gear 802 engaged with the worm wheel 205 of the above-described first planetary gear mechanism 2. Here, with this mechanism, a self lock is possible so that the worm gear 802 may not be rotated even if the worm wheel 205 is operated.

A steering mechanism driving means 9 serves to drive the steerable vehicle wheel controlling mechanism 5 and is composed of a steering motor 901 and a worm gear 902 engaged with the worm wheel 502 of the steerable vehicle wheel controlling mechanism 5. However, the combination of the worm wheel 502 and the worm gear 902 is a mechanism in which the rotation is possible also from the worm wheel 502, i.e., a reverse rotatable mechanism.

Also, a reactive torque detecting means 10 detects the reactive torque generated in the steering wheel 1. An actual steering angle detecting means 11 detects a steering angle of the steerable vehicle wheels 7a, 7b. A steering wheel angle detecting means 12 detects a steering angle of the steering wheel 1.

A target steering angle generating means 13 calculates the necessary steering angle from, for example, an output 1201 of the steering angle detecting means 12, a steering demand signal 17 from an another system (for example, a traffic-lane following system) or vehicle condition signals (for example, vehicle speed, a yaw rate or the like) 18 to thereby generate a target steering angle 1301.

An actual steering angle controlling means 14 is adapted to drive the steering mechanism driving means 9 so that the target steering angle 1301 and the actual steering angle detecting means output 1101 are equal to each other to thereby control the steering angle of the steerable vehicle wheels 7a, 7b.

A target reactive force generating means 15 serves to set a reactive torque target value to be given to the driver through the steering wheel 1 and to calculate a suitable reactive force from, for example, an output 1201 of the steering angle detecting means 12 or the vehicle condition signals (for example, vehicle speed, a yaw rate or the like) 18 to thereby generate a target reactive torque 1501.

A reactive torque controlling means 16 serves to control the drive torque of the reactive motor 8 so that the target reactive torque 1501 and an output 1001 of the reactive torque detecting means 10 are equal to each other to thereby control the reactive torque to be applied to the steering wheel 1.

The operation in the thus constructed vehicle steering system will now be described.

First of all, the operation of the vehicle steering system under the condition that the reactive torque generating means 8 or the steering mechanism driving means 9 is not operated, i.e., the condition that the ring gear 204 of the first planetary gear mechanism 2 is kept stationary by the self lock mechanism composed of the worm wheel 205 and the worm gear 802 and the steerable vehicle wheel controlling mechanism 5 are kept free for operation will now be described.

When the driver steers the steering wheel 1, the sun gear 201 of the first planetary mechanism 2 coupled with the steering wheel 1 is rotated. Although the rotation of this sun gear 201 is transmitted to the planetary gears 202a, 202b, since the ring gear 204 is kept stationary by the self lock mechanism as described above, the carrier mechanism 203 supporting the planetary gears 202a, 202b is rotated. Furthermore, the shaft 4 for transmitting the rotation to the second planetary gear mechanism 3 is rotated by the rotation of this carrier mechanism 203. Namely, the first planetary gear mechanism 2 operates as a planetary gear type speed reducer.

Also, the rotation of the shaft 4 is transmitted to the carrier mechanism 303 of the second planetary gear mechanism 3 and this carrier mechanism 303 is rotated so that the planetary gears 302a, 302b orbits around the sun gear 301. Since the ring gear 304 is kept stationary in the second planetary gear mechanism 3, the sun gear 301 is rotated by the orbital rotation of the planetary gears 302a, 302b. Furthermore, the rack and pinion 501 of the steerable vehicle wheel controlling mechanism 5 coupled mechanically with the sun gear 301 is rotated to thereby change the steering direction of the steerable vehicle wheels 7a, 7b. Namely, the second planetary gear mechanism 3 operates as a speed increasing gear with respect to the shaft 4.

As described above, the rotation of the steering wheel 1 is mechanically transmitted to the rack and pinion 501 and its transmission ratio is at one-to-one (A value obtained by multiplying the speed reduction rate of the first planetary gear mechanism 2 and the speed increasing rate of the second planetary gear mechanism 3. If the structures of both are the same, the gear reduction rate becomes 1 as a whole.) Namely, unless the reactive torque generating means 8 or the steering mechanism driving means 9 is operated, the vehicle steering apparatus in accordance with Embodiment 1 operates as a normal non-assist type steering mechanism.

The operation of the vehicle steering system in the condition that the steering wheel 1 is kept stationary and the steering mechanism driving means 9 is kept free, i.e., the condition that the ring gear 204 is rotated by the reactive force generating means 8 will now be described.

When the ring gear 204 is rotated by the reactive torque generating means 8, the rotation of the ring gear 204 is transmitted to the planetary gears 202a, 202b but the sun gear 201 coupled with the steering wheel 1 is kept stationary. Accordingly, the rotation of the ring gear 204 causes the planetary gears 202a, 202b to orbit therearound. Furthermore, the shaft 4 is rotated through the carrier mechanism 203 by the orbital rotation of the planetary gears 202a, 202b.

The steerable vehicle wheel controlling mechanism 5 is driven through the second steering mechanism 3 by the rotation of this shaft 4 as described above. The steering direction of the steerable vehicle wheels 7a, 7b is changed.

Namely, the rotation generated on the basis of the rotation of the ring gear 204 by the reactive torque generating means 8 is added to the transmission of the rotation to the steering controlling mechanism 5 from the steering wheel 1 under the condition that the reactive torque generating means 8 or the steering mechanism driving means 9 is not operated as described above. As described above, it is possible to realize the sub steering mechanism that may be electrically controlled as desired.

The operation of the vehicle steering system under the condition the steerable vehicle wheels 7a, 7b are steered by the steering mechanism driving means 9 under the condition that the steering wheel 1 is kept by the driver will now be described.

When the steerable vehicle wheel controlling mechanism 5 is driven by the steering mechanism driving means 9, the steerable vehicle wheel controlling mechanism 5 generates the rotation for steering the steerable vehicle wheels 7a, 7b and it is transmitted to the driver who steers the steering wheel 1 through the second planetary gear mechanism 3, the shaft 4 and the first planetary gear mechanism 2. Namely, a twist is generated between the steering wheel 1 that is steered by the driver and the sun gear 201 rotated by the steerable vehicle wheel controlling mechanism 5, and the twist is detected as the reactive torque 1001 by the reactive torque detecting means 10.

When the reactive torque 1001 detected by the reactive torque detecting means 10 is inputted into the reactive torque controlling means 16 and the ring gear 204 of the first planetary gear mechanism 2 is rotated by the reactive torque generating means 8 so that the reactive torque controlling means 16 causes the reactive torque 1001 inputted becomes a predetermined value, the twist angle between the steering wheel 1 and the sun gear 201 is automatically controlled so as to be a twist corresponding to the target reactive torque 1501 given to the reactive torque controlling means 16.

Namely, even in the case where the operation is to be performed by controlling the reactive torque 1001 so that the steering angle of the steering wheel 1 and the steering angle of the steerable vehicle wheels 7a, 7b are different from each other, if the sub steering angle (corresponding to the difference between the steering angle of the steering wheel 1 and the actual steering angle) is obtained, it is unnecessary to obtain the rotational angle of the ring gear 204 and it is possible to control the reactive torque 1001 to be applied to the steering wheel 1 independently of the actual steering angle.

An example of a specific operation of the vehicle steering system in accordance with Embodiment 1 will now be described by exemplifying a variable gear ratio mechanism for changing a ratio between the steering angle of the steering wheel 1 and the actual steering angle of the steerable vehicle wheels 7a, 7b depending upon the travel condition of the vehicle.

Figure 2:
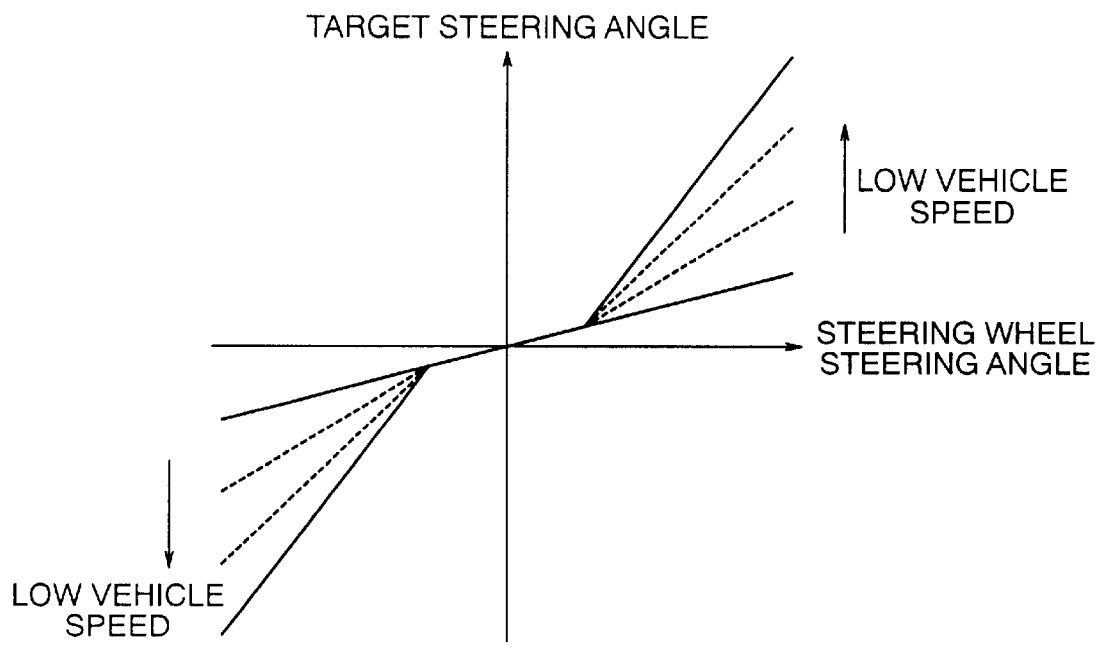
FIG. 2 is a map for calculating a target steering angle in the vehicle steering system in accordance with Embodiment 1 of the present invention.
Figure 3:
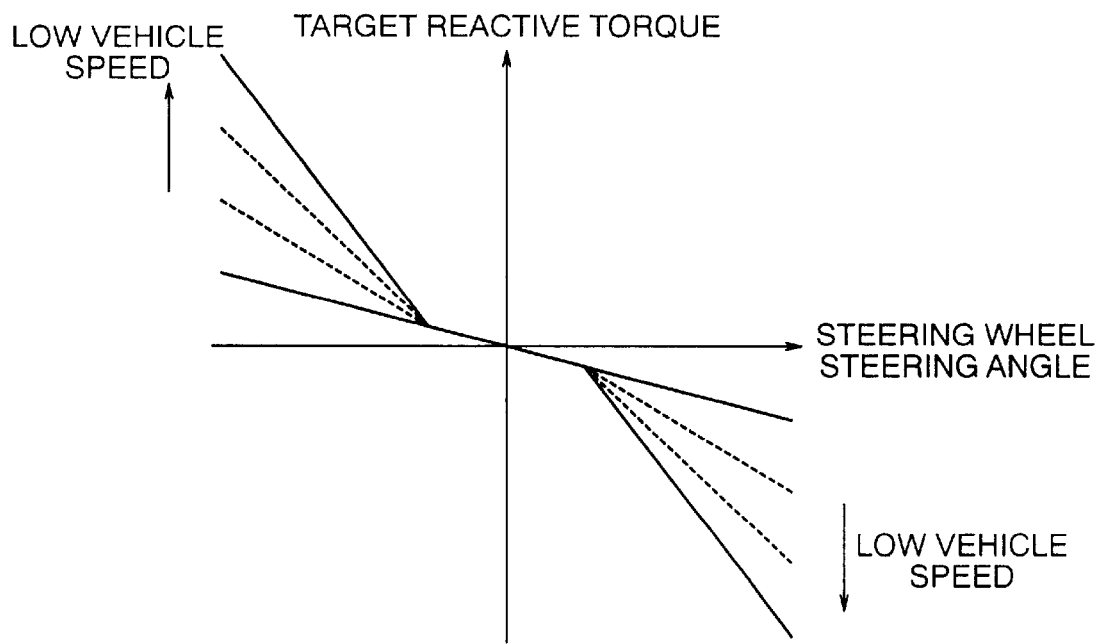
FIG. 3 is a map for calculating a target reactive torque in the vehicle steering system in accordance with Embodiment 1 of the present invention.

FIG. 2 shows an example of a map for calculating the target steering angle 1301 with respect to the steering wheel steering angle 1201 corresponding to the vehicle speed. FIG. 3 shows an example of a map for calculating the target reactive torque 1501 with respect to the steering wheel steering angle 1201 corresponding to the vehicle speed.

The steering angle 1201 of the steering wheel 1 operated by the driver is detected by the steering angle detecting means 12 and inputted into the target steering angle generating means 13. The target steering angle generating means 13 outputs the target steering angle 1301 corresponding to the steering angle 1201 and the vehicle condition signal 18 (the vehicle speed in this case) on the basis of the map shown in FIG. 2. The actual steering controlling means 14 drives the steering mechanism driving means 9 so that the target steering angle 1301 and the output 1101 of the actual steering angle detecting means 11 are equal to each other to thereby control the steerable vehicle wheel controlling mechanism 5. Thus, it is possible to determine the steering amount of the steering wheel 1 and the actual steering angle as shown in, for example, FIG. 2 as desired.

On the other hand, the steering wheel steering angle 1201 is inputted into the target reactive force generating means 15. The target reactive force generating means 15 calculates and outputs the target reactive torque 1501 corresponding to the steering wheel steering angle 1201 and the vehicle condition signal 18 (the vehicle speed in this case) on the basis of the map shown in FIG. 3. The target reactive torque 1501 is inputted into the reactive torque controlling means 16 and the reactive torque generating means 8 is controlled so that the reactive torque 1001 detected by the reactive force detecting means 10 and the target reactive torque 1501 are equal to each other. Thus, it is possible to determine also the reactive torque to be added to the steering wheel as desired as shown in, for example, FIG. 3.

As described above, it is possible to determine and control the relationship of the steering direction of the steerable vehicle wheels 7a, 7b with respect to the steering wheel steering angle 1201 of the steering wheel 1 and the reactive torque 1001 independently of each other by the above-described steering mechanism and the control method as desired as described above.

The arrangement of the steering wheel 1, the steering wheel angle detecting means 12 and the reactive torque detecting means 10 will now be described.

The reactive torque detecting means 10 is adapted to detect the torque by the twist angle of a torsion bar. The larger the twist angle with respect to the torque to be applied becomes, the higher the precision becomes. Accordingly, the order of the steering wheel 1, the steering wheel angle detecting means 12, the reactive torque detecting means 10 and the first planetary gear mechanism 2 is the best order as the order for arranging the components between the steering wheel 1 and the planetary gear mechanism 2.

In an arrangement such as described above, even if the twist angle of the torsion bar with respect to the input torque to the reactive torque detecting means 10 is large, since the actual steering angle is controlled on the basis of the steering angle of the steering wheel 1, there is no adverse effect of the twist of the reactive torque detecting means 12.

The case where the steering operation is performed on the basis of the steering command from an another system will now be described.

For example, a traffic-lane following system may be used as the another system. This traffic-lane following system is a system of steering the steerable vehicle wheels 7a, 7b so that the vehicle will not travel off-lane, on the basis of the recognition result from a sensor for recognizing the lane such as a white traffic-line recognition camera. The details of the traffic-lane following system will not be described here. Briefly explaining, in that system, when the vehicle is likely to be deviated from the traffic lane due to uncareful or inattentive steering or because the driver falls asleep during driving, a steering angle such as to prevent such deviation from the lane is calculated and corresponding steering operation is performed.

This system will now be described with respect to a method for constructing the vehicle steering system according to this invention. The traffic-lane following system determines the deviation of the lane on the basis of the recognized lane information and the vehicle condition and, as a result, sends the traffic-lane following steering angle to the target steering generating means 13 of the present vehicle steering system as a steering demand signal 17 through telecommunication. Accordingly, the target steering angle generating means 13 outputs the target steering angle 1301 from the vehicle condition signal 18 of the steering demand signal 17, the steering wheel angle signal 1201 from the steering wheel angle detecting means and the like.

Thus, the actual steering controlling means 14 controls the steering of the steerable vehicle wheels 7a, 7b and realizes the control for preventing deviation from the lane.

Also, the target steering angle generating means 13 compares the steering demand signal 17 and the steering wheel angle signal 1201, and if as a result of the comparison it is judged as the steering demand that is not intended by the driver, it may generate the target steering angle 1301 on the basis of the steering operation by the driver. Thus, it is possible to constitute the traffic-lane following system that is superior in man-machine interface. Furthermore, if, for example, TTCAN (Time Triggered CAN) is used as a communication method used in this case, it is possible to ensure the communication that guarantees real-time operation. Since there is no time lag in command, it is possible to enhance the controllability upon the automatic steering operation.

Finally, the operation upon the failure in the vehicle steering system according to Embodiment 1 will now be described.

In the case where the abnormality of the vehicle steering system such as a fault of the steering wheel detecting means 12 and a fault of the reactive torque detecting means 10 is detected by an abnormality detecting means (not shown), the abnormality detecting means releases the reactive torque generating means 8 and the steering mechanism driving means 9, respectively.

For example, it is possible to consider setting the current caused to flow through the reactive motor 801 and the steering motor 901 at zero or interrupting the power source path by a relay or the like.

Thus, by releasing the two motors 801, 901, as described above, the vehicle steering system according to Embodiment 1 serves as a non-assist steering apparatus.

Also, even if there is a fault of removal of the battery line during travel, the reactive motor 801 and the steering motor 901 are kept released to become the non-assist apparatus to thereby maintain safety.

Also, for such a fault that the steering motor 901 used in the steering mechanism driving means 9 is locked by the damage in the interior thereof or the like, an electromagnetic clutch which turns on upon electric supply is provided at the output of this steering motor 901. Upon detection of the abnormality, the above-described electromagnetic clutch is turned off to thereby avoid disabling the steering operation. Also, upon the interruption of the power source, since the clutch is turned off, it is possible to ensure safety.

Embodiment 2

Figure 4:
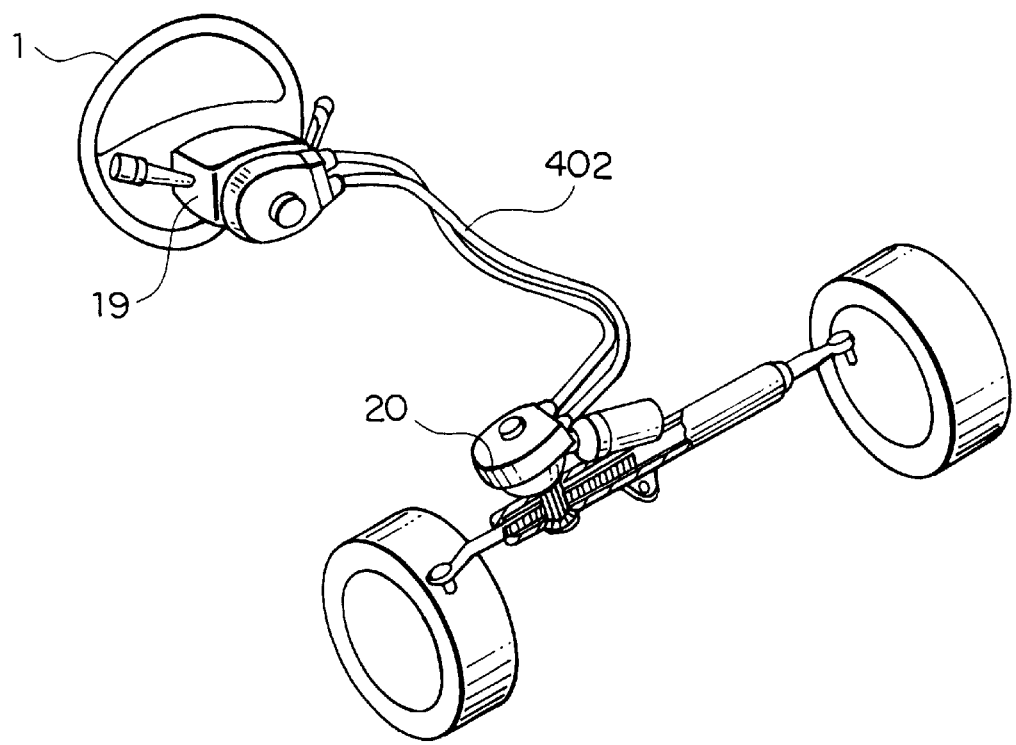
FIG. 4 is a view showing an outer appearance of a vehicle steering system in accordance with Embodiment 2 of the present invention.
Figure 5:
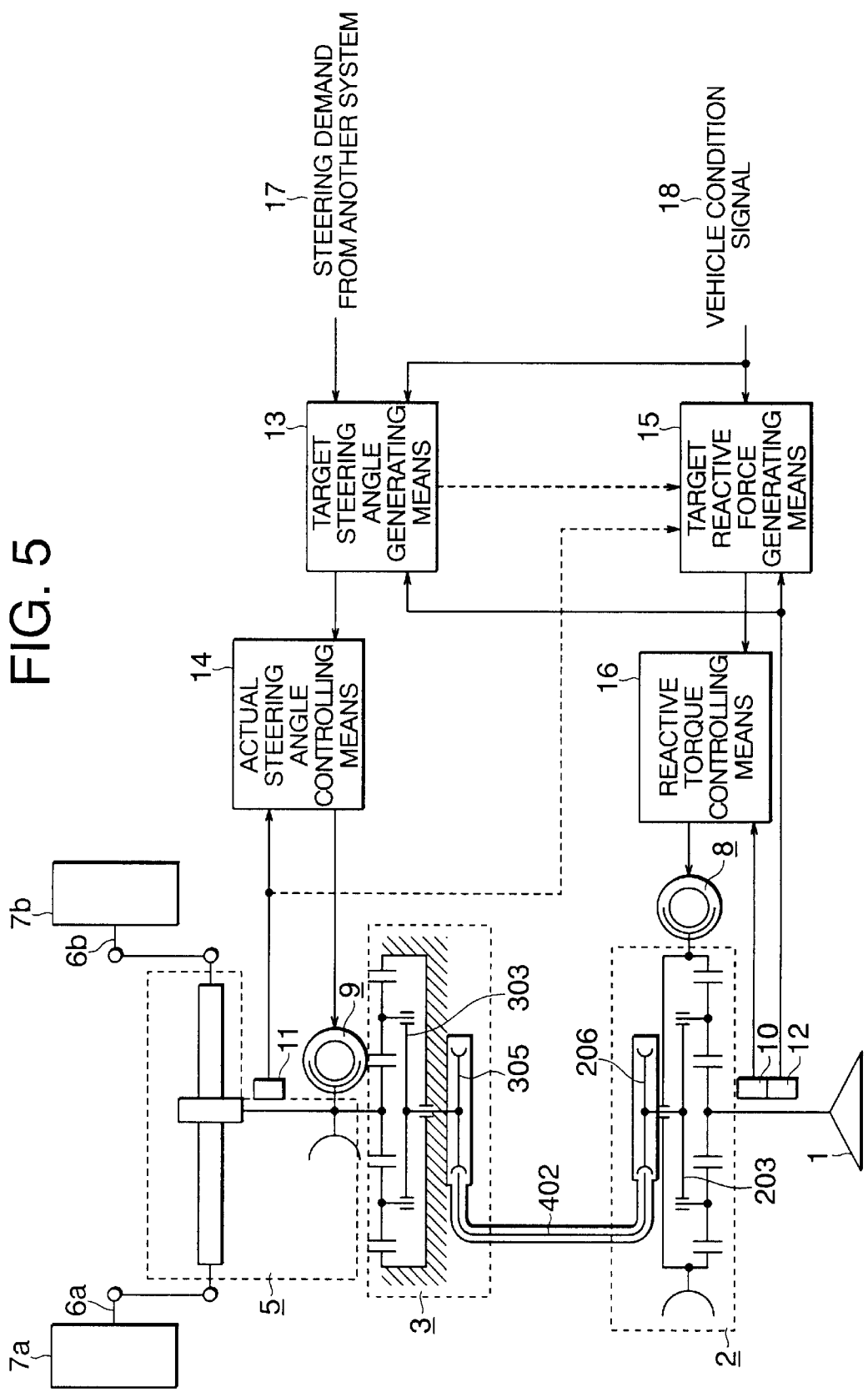
FIG. 5 is a structural view of a vehicle steering system in accordance with Embodiment 2 of the present invention.

FIG. 4 is an overview of a vehicle steering system in accordance with Embodiment 2 of the present invention. FIG. 5 is a structural view. The structure shown in FIGS. 4 and 5 will now be described.

In Embodiment 2, instead of the shaft 4 in accordance with Embodiment 1 described above, a pulley 206 is connected to the carrier mechanism 203 of the first planetary gear mechanism 2, and a pulley 305 is also connected to the carrier mechanism 303 of the second planetary gear mechanism 3. The two pulleys 206, 305 are connected to a deformable cable 402 for transmission of rotation therebetween. Also, the first planetary gear mechanism 2 is disposed in a steering wheel column 19 and the second planetary gear mechanism 3 is disposed in a steering device rear portion 20. The operation is the same as that of Embodiment 1 described above.

As described above, in the vehicle steering system in accordance with Embodiment 2, since the deformable cable 402 absorbs the rearward movement of the steerable vehicle wheel controlling mechanism 5 upon collision of the vehicle, the steering wheel 1 would not be moved rearwardly and hence the damage given from the steering wheel 1 to the driver may be reduced to thereby enhance the safety upon the collision.

Embodiment 3

Figure 6:
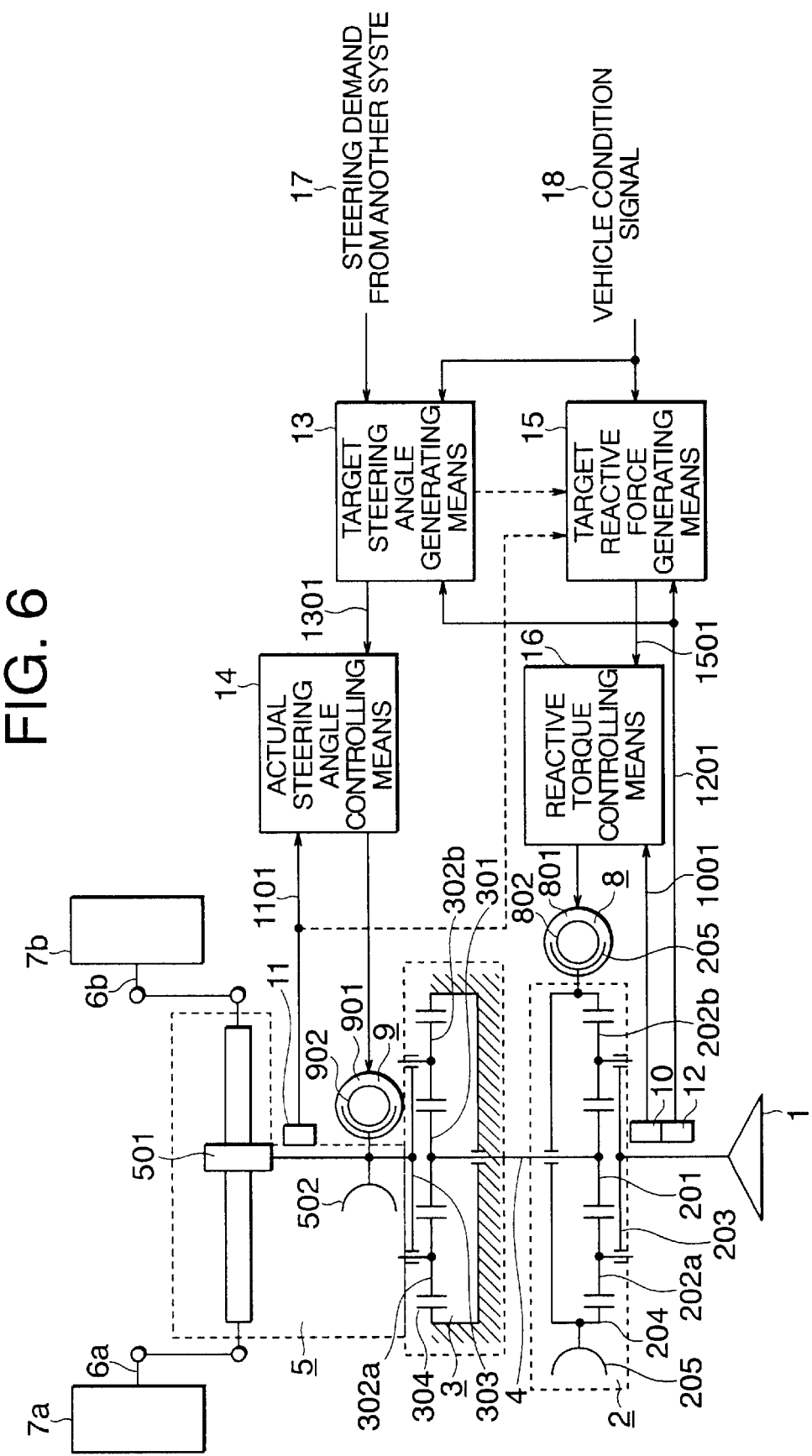
FIG. 6 is a structural view of a vehicle steering system in accordance with Embodiment 3 of the present invention.

FIG. 6 is a structural view of a vehicle steering system in accordance with Embodiment 3 of the present invention. The structure in FIG. 6 will be described below. The structure shown in FIG. 6 is substantially the same as that of Embodiment 1 described above. Therefore, only the points different therefrom will be described.

In the first planetary gear mechanism 2, instead of the sun gear 201, the carrier mechanism 203 is coupled with the steering wheel 1, the planetary gears 202a, 202b are supported by the carrier mechanism 203, the sun gear 201 and the ring gear 204 are engaged with the planetary gears 202a, 202b, and further, the worm wheel 205 is provided for rotating the ring gear 204. Namely, this is a structure in which the positions of the sun gear 201 and the carrier mechanism 203 are reversed from those in Embodiment 1.

Also, instead of the carrier mechanism 303, the sun gear 301 is coupled with the sun gear 201 of the above-described first planetary mechanism through the shaft 4 and the second planetary gear mechanism 3 is composed of the planetary gears 202a, 202b engaging with this sun gear 301 and the stationary ring gear 304 and located therebetween and the carrier mechanism for supporting the planetary gears 202a, 202b. Namely, this is a structure in which the positions of the sun gear 301 and the carrier mechanism 303 are reversed from those in Embodiment 1.

Accordingly, the shaft 4 connects the sun gear 301 of the above-described first planetary gear mechanism and the sun gear 201 of the above-described second planetary gear mechanism for transmission of power.

Also, the rack and pinion 501 owned by the rack-and-pinion type steerable vehicle wheel controlling mechanism 5 is mechanically connected to the carrier mechanism 303 of the above-described second planetary gear mechanism 3.

The operation of the vehicle steering system composed of the above-described structure will now be described.

The operation of the vehicle steering apparatus under the condition that the reactive torque generating means 8 or the steering mechanism driving means 9 is not operated, i.e., the condition that the ring gear 204 of the first planetary gear mechanism 2 is kept stationary by the self lock mechanism composed of the worm wheel 205 and the worm gear 802 and the steerable vehicle wheel controlling mechanism 5 may be kept free for operation will now be described.

When the driver steers the steering wheel 1, the carrier mechanism 203 of the first planetary mechanism 2 coupled with the steering wheel 1 is rotated. Although the rotation of this carrier mechanism 203 is transmitted to the planetary gears 202a, 202b, since the ring gear is kept locked as in Embodiment 1 described above, the sun gear 201 engaging with the planetary gears 202a, 202b is rotated. Furthermore, the shaft 4 for transmitting the rotation to the second planetary gear mechanism 3 is rotated by the rotation of this sun gear 201. Namely, the first planetary gear mechanism 2 operates as a planetary gear type speed increasing device.

Also, the rotation of the shaft 4 is transmitted to the sun gear 301 of the second planetary gear mechanism 3 and this sun gear 301 is rotated so that the planetary gears 302a, 302b orbits between the sun gear 301 and the ring gear 304. Then, since the ring gear 304 is kept stationary in the second planetary gear mechanism 3, the carrier mechanism 303 supporting the planetary gears 302a, 302b is rotated by the orbital rotation of the planetary gears 302a, 302b. Furthermore, the rack and pinion 501 of the steerable vehicle wheel controlling mechanism 5 coupled mechanically with the carrier mechanism 303 is rotated to thereby change the steering direction of the steerable vehicle wheels 7a, 7b. Namely, the second planetary gear mechanism 3 operates as a speed reducer with respect to the shaft 4.

As described above, the rotation of the steering wheel 1 is mechanically transmitted to the rack and pinion 501 and its transmission ratio is at one-to-one (A value obtained by multiplying the speed increasing rate of the first planetary gear mechanism 2 and the speed reduction rate of the second planetary gear mechanism 3. If the structures of both are the same, the gear reduction rate becomes 1 as a whole.) Namely, unless the reactive torque generating means 8 or the steering mechanism driving means 9 is operated, the vehicle steering apparatus in accordance with Embodiment 1 operates as a normal non-assist type steering mechanism.

Here, since the rotation of the shaft 4 operates in the speed increasing manner for the rotation of the steering wheel 1, the torque necessary for the shaft 4 to transmit in the non-assist mode is at 1/speed increasing rate and thus is smaller than that necessary in the normal steering mechanism. Accordingly, it is possible to use a shaft that has a small rigidity in the rotational direction, i.e., a shaft that is deformable or thin.

In particular, as shown in FIG. 6, the first planetary gear mechanism 2 is disposed in the steering wheel column portion 19 and the second planetary gear mechanism 3 is disposed in the steering device rear portion 20. A shaft 403 that is a thin shaft or a deformable shaft connects the two portions. Accordingly, it is possible to steer in the non-assist mode. Simultaneously, in the case where the steering mechanism is moved rearwardly upon collision, the thin shaft or the flexible shaft 403 is deformed or broken down to thereby absorb the rearward movement thereof to thereby make it possible to reduce the damage given from the steering wheel 1 to the driver.

Embodiment 4

Figure 7:
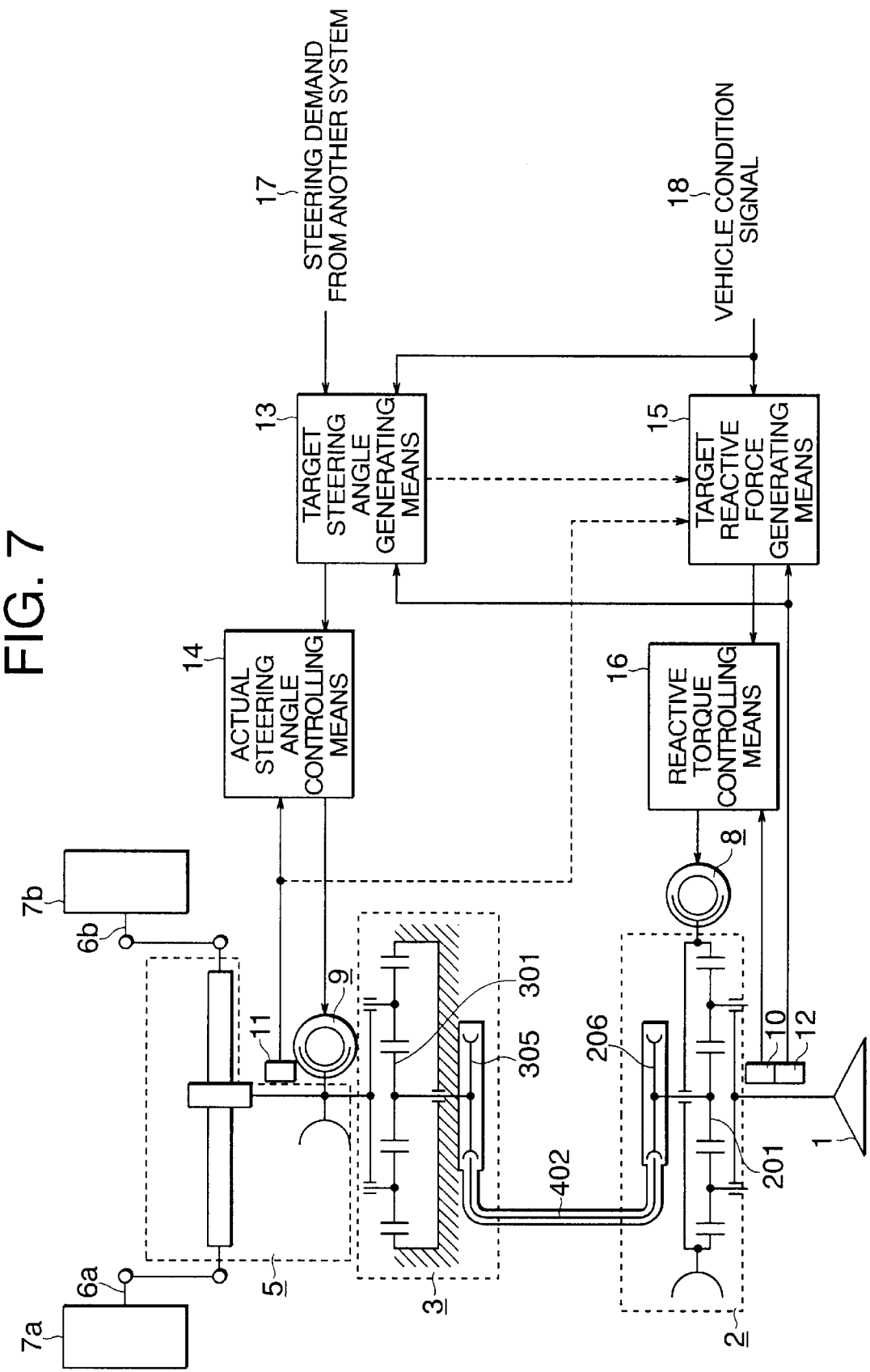
FIG. 7 is a structural view of a vehicle steering system in accordance with Embodiment 4 of the present invention.

FIG. 7 is a structural view showing a vehicle steering system in accordance with Embodiment 4 of the present invention. The structure shown in FIG. 7 will now be described.

In the vehicle steering system in accordance with Embodiment 4, the pulley 206 is connected to the sun gear 201 of the first planetary gear mechanism 2 instead of the shaft 4 in the vehicle steering system in accordance with the Embodiment 3 described above, and the pulley 305 is connected also to the sun gear 301 of the second planetary gear mechanism 3. The two pulleys 206, 305 are connected with each other through a deformable cable 402 for the rotation transmission therebetween. Also, the first planetary gear mechanism 2 is disposed in the steering wheel column 19 and the second planetary gear mechanism 3 is disposed in the steering device rear portion 20. The operation thereof is the same as that of Embodiment 3 described above.

As described above, in the vehicle steering system in accordance with Embodiment 4, since the deformable cable 402 absorbs the rearward movement of the steerable vehicle wheel controlling mechanism 5 upon the collision of the vehicle, the steering wheel 1 will not be moved rearwardly and hence the damage given from the steering wheel 1 to the driver may be reduced to thereby enhance safety upon the collision.

Embodiment 5

Figure 8:
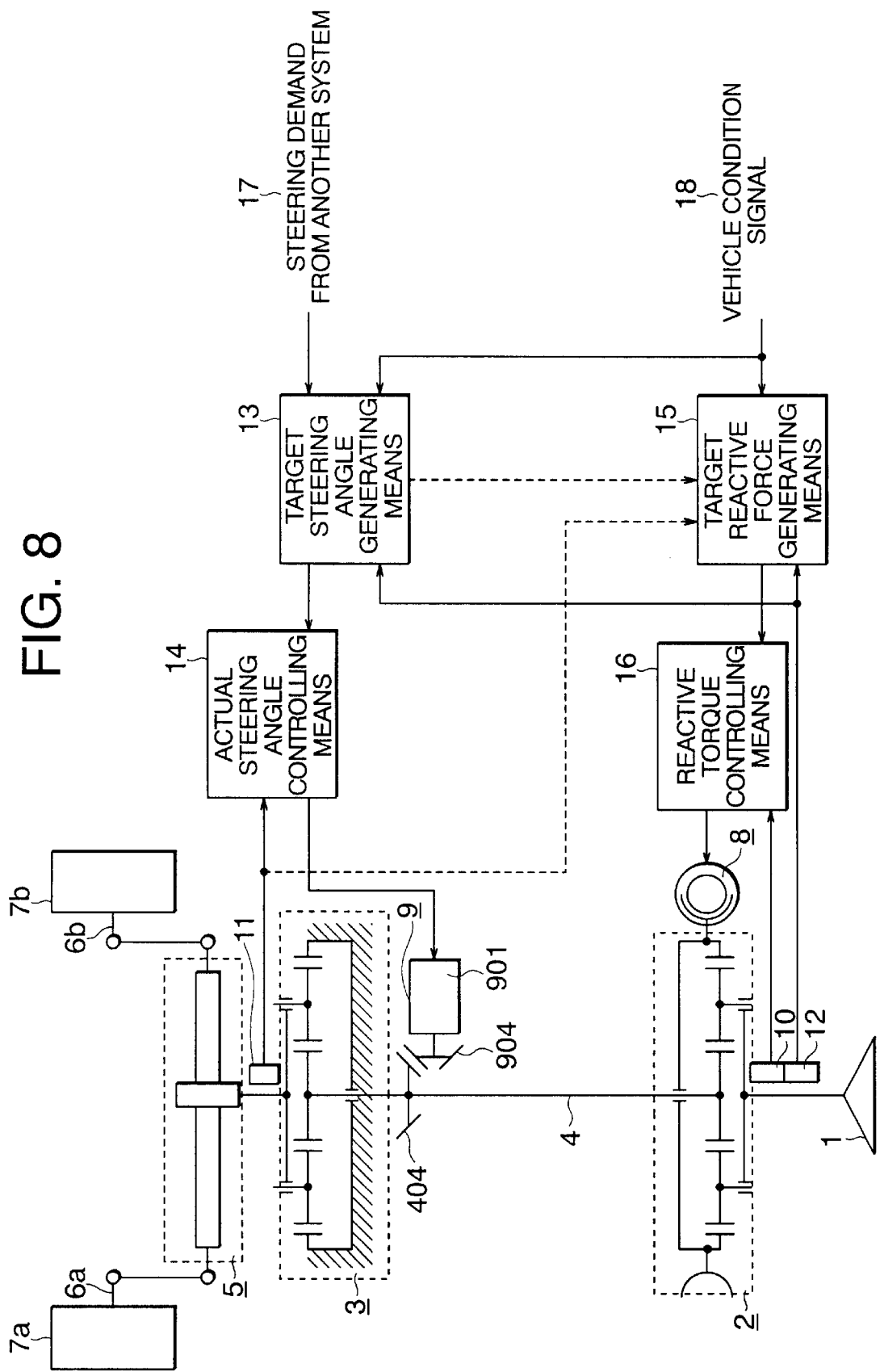
FIG. 8 is a structural view of a vehicle steering system in accordance with Embodiment 5 of the present invention.

FIG. 8 is a structural view showing a vehicle steering system in accordance with Embodiment 5 of the present invention. The structure shown in FIG. 8 will now be described.

In FIG. 8, the function realized by the worm wheel 502 of the steerable vehicle wheel controlling mechanism 5 and the steering mechanism driving means 9 in Embodiment 3 described above is realized by a bevel gear 904 of a steering mechanism driving means 9 and a bevel gear 404 connected to the shaft 4.

As described in Embodiment 3 described above, since the second planetary gear mechanism 3 in this structure serves as a speed reducer as viewed from the shaft 4, the speed reduction rate from the steering motor 901 of the steering mechanism driving means 9 to the rack and pinion 501 becomes a value obtained by multiplying the speed reduction rate by the bevel gears 404 and 904 by the speed reduction rate of the planetary gear mechanism 3. Namely, since in order to obtain the speed reduction rate that is substantially equal to the reduction rate by the worm gear 902 and the worm wheel 502 in Embodiment 5, the reduction rate by the bevel gears 404, 904 may be reduced by as much as the reduction rate by the planetary gear mechanism 3. Thus, even if the speed reduction mechanism utilizing the bevel gears is used, the overall system is not enlarged so that it is possible to construct the system with a compact size. Also, it is possible to obtain the apparatus that is superior to that with the worm gear 902 in efficiency.

Figure 9:
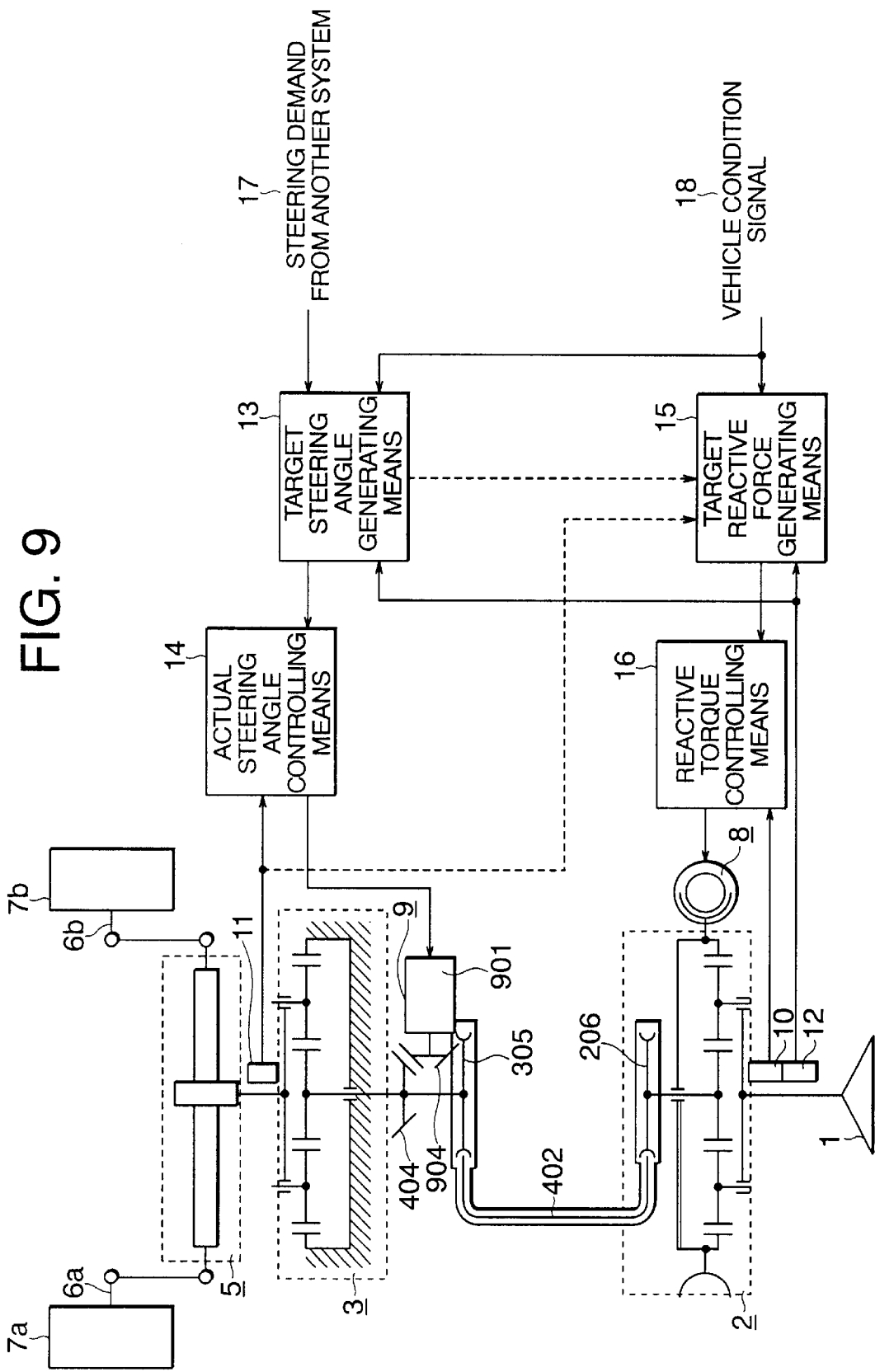
FIG. 9 is a structural view of a vehicle steering system in accordance with Embodiment 5 of the present invention.

Also, on the basis of the same concept, an example in which the mode of this embodiment is applied to the vehicle steering system in Embodiment 4 is shown in FIGS. 9 and 10.

In FIG. 9, the sun gear 301 of the second planetary gear mechanism 3 may be rotated by the bevel gears 404, 904 in the steering mechanism driving means 9. Also, in FIG. 10, since there is no shaft, the speed reduction mechanism by the spur gears 405, 905 may be used without using the bevel gears.

As described above, in the vehicle steering system in accordance with the present invention, it is possible to simultaneously execute the automatic steering operation on the basis of the target steering angle generating means with the manual steering operation by the steering wheel and to provide the steering feeling as normal. Therefore, it is possible to simultaneously execute the automatic steering operation on the basis of the target steering angle generating means with the manual steering operation by the steering wheel and to provide the steering feeling as normal.

Also, the steering amount of the steering wheel is mechanically transmitted to the steerable vehicle wheels through the first planetary gear mechanism and the second planetary gear mechanism to operate as the manual steering mechanism to thereby make it possible to enhance the safety.

Also, the above-described deformable cable absorbs the rearward movement of the steerable vehicle wheel mechanism upon collision so that the steering wheel will not be pushed thereby to move rearwardly. Furthermore, it is possible to reduce the damage given from the steering wheel to the driver to thereby make it possible to enhance the safety upon collision.

Also, the steering amount of the steering wheel is mechanically transmitted to the steerable vehicle wheels through the first planetary gear mechanism and the second planetary gear mechanism to operate as the manual steering mechanism to thereby make it possible to enhance the safety.

Also, the adverse effect to the driver by the shaft due to the external impact force upon the collision of the vehicle to thereby make it possible to enhance safety upon the collision.

Also, the adverse effect to the driver by the shaft due to the external impact force applied upon collision of the vehicle to thereby make it possible to enhance safety upon the collision.

Also, the coupling means may be rotated by an actuator such as an electric motor or the like to thereby make it possible to reduce the speed reduction rate in the actuator and the coupling means and to realize the vehicle steering system that is compact and has high efficiency.

Also, the rearward movement of the steering wheel mechanism upon collision of the vehicle is absorbed by the above-described deformable cable so that the steering wheel will not be pushed thereby or moved rearwardly and it is possible to reduce the damage given from the steering wheel to the driver to thereby make it possible to enhance safety upon the collision.

Also, it is possible to rotate the second sun gear in the second planetary gear mechanism by an actuator such as an electric motor or the like, whereby it is possible to reduce the speed reduction rate between the actuator and the second sun gear and to realize the vehicle steering system that is compact and has high efficiency.

Also, it is possible to detect the steering angle of the steering angle without any adverse effect of the twist of the torsion bar.

Also, the steering operation by the driver is transmitted through the mechanical link to the steerable vehicle wheels to enable the manual steering to thereby enhance safety upon occurrence of the abnormality of the vehicle steering system.

Also, upon detecting an abnormality, only by prohibiting the control by the reactive torque controlling means, the steering wheel operation by the driver may be transmitted to the steering wheel through the mechanical link to thereby perform manual steering, so that safety during the abnormality of the vehicle steering system is enhanced.

Also, the first interrupting means and the second interrupting means are composed of worm gear sets to thereby make it possible to constitute the vehicle steering system at low cost.

Also, the worm gear sets are released by the electric motor having a clutch incorporated therein, whereby, even if the electric motor is broken down, it is possible to release the sub steering mechanism and thus the steering by the driver is not obstructed. Thus, it is possible to enhance the safety.

What is claimed is:

1. A vehicle steering system having a steering mechanism for steering steerable vehicle wheels in response to a rotating amount of a steering wheel and a biasing amount given by a sub steering mechanism for compensating for the rotating amount of the steering wheel by applying a drive torque thereto, said system comprising:

a target reactive force generating means for generating a target value of a reactive torque to be applied to said steering wheel;

a reactive torque detecting means for detecting the reactive torque being applied to said steering wheel;

a reactive torque controlling means for controlling the drive torque to be applied to said sub steering mechanism so that a target torque generated by said target reactive force generating means and the reactive torque detected by said reactive torque detecting means become equal to each other;

a steerable vehicle wheel controlling mechanism for controlling a steering direction of said steerable vehicle wheels;

an actual steering angle detecting means for detecting an actual steering angle of said steerable vehicle wheels to be controlled by said steerable vehicle wheel controlling mechanism;

a target steering angle generating means for generating a target value of the steering angle of said steerable vehicle wheels;

an actual steering angle controlling means for driving and controlling said steerable vehicle wheel controlling mechanism so that the target steering angle generated by said target steering angle generating means and the actual steering angle detected by said actual steering angle detecting means become equal to each other;

an abnormality detecting means for detecting abnormality of the vehicle steering system;

a first interrupting means for interrupting a control signal sent from said actual steering angle controlling means to said sub steering mechanism on the basis of an abnormal signal from said abnormality detecting means; and a second interrupting means for interrupting a control signal sent from said reactive torque controlling means to said sub steering mechanism on the basis of an abnormal signal from said abnormality detecting means.

2. The vehicle steering system according to claim 1, further comprising a steering angle detecting means for detecting the steering angle generated by a rotating angle of the steering wheel, wherein said target reactive force generating means generates said target value of the reactive torque on the basis of said steering angle, and said target steering angle generating means generates said target value of the steering angle on the basis of said steering angle.

3. The vehicle steering system according to claim 2, wherein said reactive torque detecting means has a torsion bar incorporated therein which is connected to said steering wheel, and wherein in the case where a twist angle of said torsion bar is to be detected, said steering angle detecting means is provided between said reactive torque detecting means and said steering wheel.

4. The vehicle steering system according to claim 3, wherein a larger a size of the twist angle of said torsion bar with respect to an applied torque results in higher precision of control with respect to the steering wheel and the steerable vehicle wheels.

5. The vehicle steering system according to claim 1, wherein said sub steering mechanism comprises:

a first planetary gear mechanism having a first sun gear connected to said steering wheel, a first ring gear operating in response to a control by said reactive torque controlling means, a first planetary gear disposed between said first sun gear and said first ring gear, and a first carrier mechanism for supporting said first planetary gear;

a second planetary gear mechanism having a second sun gear connected to said steering wheel controlling mechanism, a second ring gear operating in response to control by said actual steering angle controlling means, a second planetary gear disposed between said second sun gear and said second ring gear, and a second carrier mechanism for supporting said second planetary gear; and a coupling means for mechanically coupling said first carrier mechanism and said second carrier mechanism, and wherein either one of said first ring gear and said second ring gear is rotatingly controlled while the other ring gear is kept stationary.

6. The vehicle steering system according to claim 5, further comprising:

a pulley provided in each of said first carrier mechanism and said second carrier mechanism, wherein said coupling means is composed of a cable for connecting the two pulleys with each other, which may be deformed and is capable of transmitting a rotation, and said first planetary gear mechanism is disposed in a steering wheel column portion whereas said second planetary gear mechanism is disposed in said steerable vehicle wheel controlling mechanism.

7. The vehicle steering system according to claim 1, wherein said sub steering mechanism comprises:

a first planetary gear mechanism having a first carrier mechanism connected to said steering wheel, a first planetary gear supported to said first carrier mechanism, a first ring gear operating in response to control by said reactive torque controlling means, a first sun gear disposed in a center of between said first planetary gear and said first ring gear;

a second planetary gear mechanism having a second carrier mechanism connected to said steering wheel controlling mechanism, a second planetary gear supported by said second carrier mechanism, a second ring gear operating in response to control by said actual steering angle controlling means, and a second sun gear disposed in a center between said second planetary gear and said second ring gear; and a coupling means for mechanically coupling said first sun gear and said second sun gear, and wherein either one of said first ring gear and said second ring gear is rotatingly controlled while the other ring gear is kept stationary.

8. The vehicle steering system according to claim 7, wherein said coupling means is composed of a thin shaft that is deformed by impact force upon vehicle collision, and said first planetary gear mechanism is disposed in a steering wheel column portion and said second planetary gear mechanism is disposed in said steerable vehicle wheel controlling mechanism.

9. The vehicle steering system according to claim 7, wherein said coupling means is composed of a shaft that may be freely deformed, and said first planetary gear mechanism is disposed in a steering wheel column portion and said second planetary gear mechanism is disposed in said steerable vehicle wheel controlling mechanism.

10. The vehicle steering system according to claim 9, wherein said actual steering angle controlling means is disposed in the second sun gear of said second planetary gear mechanism to drive and control said second sun gear.

11. The vehicle steering system according to claim 7,
wherein said actual steering angle controlling means is disposed in said coupling means to drive and control said steerable vehicle wheel controlling mechanism through said coupling means.

12. The vehicle steering system according to claim 7, further comprising a pulley provided in each of said first sun gear and said second sun gear,
wherein said coupling means is composed of a cable for connecting the two pulleys with each other, which may be deformed and is capable of transmitting a rotation, and
said first planetary gear mechanism is disposed in a steering wheel column portion whereas said second planetary gear mechanism is disposed in said steerable vehicle wheel controlling mechanism.

13. The vehicle steering system according to claim 1,
wherein when electric control of said sub steering mechanism performs the electric control is not to be performed, said first interrupting means and said second interrupting means are driven.

14. The vehicle steering system according to claim 13,
wherein said first interrupting means and said second interrupting means are composed of worm gear sets.

15. The vehicle steering system according to claim 14,
wherein said worm gear sets are released by an electric motor having a clutch incorporated therein.

16. A vehicle steering system having a steering mechanism for steering steerable vehicle wheels in response to a rotating amount of a steering wheel and a biasing amount given by a sub steering mechanism for compensating for the rotating amount of the steering wheel by applying a drive torque thereto, said system comprising:
a target reactive force generating means for generating a target value of a reactive torque to be applied to said steering wheel;
a reactive torque detecting means for detecting the reactive torque being applied to said steering wheel;
a reactive torque controlling means for controlling the drive torque to be applied to said sub steering mechanism so that a target torque generated by said target reactive force generating means and the reactive torque detected by said reactive torque detecting means become equal to each other;
a steerable vehicle wheel controlling mechanism for controlling a steering direction of said steerable vehicle wheels;
an actual steering angle detecting means for detecting an actual steering angle of said steerable vehicle wheels to be controlled by said steerable vehicle wheel controlling mechanism;
a target steering angle generating means for generating a target value of the steering angle of said steerable vehicle wheels; and
an actual steering angle controlling means for driving and controlling said steerable vehicle wheel controlling mechanism so that the target steering angle generated by said target steering angle generating means and the actual steering angle detected by said actual steering angle detecting means become equal to each other;
wherein said sub steering mechanism comprises:
a first planetary gear mechanism having a first sun gear connected to said steering wheel, a first ring gear operating in response to control by said reactive torque controlling means, a first planetary gear disposed between said first sun gear and said first ring gear, and a first carrier mechanism for supporting said first planetary gear;
a second planetary gear mechanism having a second sun gear connected to said steering wheel controlling mechanism, a second ring gear operating in response to control by said actual steering angle controlling means, a second planetary gear disposed between said second sun gear and said second ring gear, and a second carrier mechanism for supporting said second planetary gear; and
a coupling means for mechanically coupling said first carrier mechanism and said second carrier mechanism, and
wherein either one of said first ring gear and said second ring gear is rotatingly controlled while the other ring gear is kept stationary.

17. The vehicle steering system according to claim 16, further comprising:
a pulley provided in each of said first carrier mechanism and said second carrier mechanism,
wherein said coupling means is composed of a cable for connecting the two pulleys with each other, which may be deformed and is capable of transmitting a rotation, and
said first planetary gear mechanism is disposed in a steering wheel column portion whereas said second planetary gear mechanism is disposed in said steerable vehicle wheel controlling mechanism.

18. A vehicle steering system having a steering mechanism for steering steerable vehicle wheels in response to a rotating amount of a steering wheel and a biasing amount given by a sub steering mechanism for compensating for the rotating amount of the steering wheel by applying a drive torque thereto, said system comprising:
a target reactive force generating means for generating a target value of a reactive torque to be applied to said steering wheel;
a reactive torque detecting means for detecting the reactive torque being applied to said steering wheel;
a reactive torque controlling means for controlling the drive torque to be applied to said sub steering mechanism so that a target torque generated by said target reactive force generating means and the reactive torque detected by said reactive torque detecting means become equal to each other;
a steerable vehicle wheel controlling mechanism for controlling a steering direction of said steerable vehicle wheels;
an actual steering angle detecting means for detecting an actual steering angle of said steerable vehicle wheels to be controlled by said steerable vehicle wheel controlling mechanism;
a target steering angle generating means for generating a target value of the steering angle of said steerable vehicle wheels;
an actual steering angle controlling means for driving and controlling said steerable vehicle wheel controlling mechanism so that the target steering angle generated by said target steering angle generating means and the actual steering angle detected by said actual steering angle detecting means become equal to each other;
a first planetary gear mechanism having a first carrier mechanism connected to said steering wheel, a first planetary gear supported to said first carrier mechanism, a first ring gear operating in response to control by said reactive torque controlling means, a first sun gear disposed in a center of between said first planetary gear and said first ring gear;

a second planetary gear mechanism having a second carrier mechanism connected to said steering wheel controlling mechanism, a second planetary gear supported by said second carrier mechanism, a second ring gear operating in response to a control by said actual steering angle controlling means, and a second sun gear disposed in a center between said second planetary gear and said second ring gear; and a coupling means for mechanically coupling said first sun gear and said second sun gear, and wherein either one of said first ring gear and said second ring gear is rotatingly controlled while the other ring gear is kept stationary.

19. The vehicle steering system according to claim 18, wherein said coupling means is composed of a thin shaft that is deformed by impact force upon vehicle collision, and said first planetary gear mechanism is disposed in a steering wheel column portion and said second planetary gear mechanism is disposed in said steerable vehicle wheel controlling mechanism.

20. The vehicle steering system according to claim 18, wherein said coupling means is composed of a shaft that may be freely deformed, and said first planetary gear mechanism is disposed in a steering wheel column portion and said second planetary gear mechanism is disposed in said steerable vehicle wheel controlling mechanism.

21. The vehicle steering system according to claim 20, wherein said actual steering angle controlling means is disposed in the second sun gear of said second planetary gear mechanism to drive and control said second sun gear.

22. The vehicle steering system according to claim 18, wherein said actual steering angle controlling means is disposed in said coupling means to drive and control said steerable vehicle wheel controlling mechanism through said coupling means.

23. The vehicle steering system according to claim 18, further comprising a pulley provided in each of said first sun gear and said second sun gear, wherein said coupling means is composed of a cable for connecting the two pulleys with each other, which may be deformed and is capable of transmitting a rotation, and said first planetary gear mechanism is disposed in a steering wheel column portion whereas said second planetary gear mechanism is disposed in said steerable vehicle wheel controlling mechanism.

* * * * *